US011640641B2

(12) United States Patent
Pai et al.

(10) Patent No.: US 11,640,641 B2
(45) Date of Patent: May 2, 2023

(54) AUTOMATED FIELD-MAPPING OF ACCOUNT NAMES FOR FORM POPULATION

(71) Applicant: Intuit Inc., Mountain View, CA (US)

(72) Inventors: Yogish Pai, Los Gatos, CA (US); Anu Singh, San Francisco, CA (US); Peter Thomas, Bangalore (IN); Madhusudhanan Dharumaraj, Bangalore (IN); Steve George Goyette, Maple Ridge (CA); Ram Shamanna, Frisco, TX (US)

(73) Assignee: Intuit Inc., Mountain View, CA (US)

( * ) Notice: Subject to any disclaimer, the term of this patent is extended or adjusted under 35 U.S.C. 154(b) by 780 days.

(21) Appl. No.: 16/667,611

(22) Filed: Oct. 29, 2019

(65) Prior Publication Data
US 2020/0065914 A1 Feb. 27, 2020

Related U.S. Application Data

(62) Division of application No. 15/472,266, filed on Mar. 28, 2017, now abandoned.

(51) Int. Cl.
*G06Q 40/12* (2023.01)
*G06Q 10/10* (2023.01)
(Continued)

(52) U.S. Cl.
CPC .......... *G06Q 40/12* (2013.12); *G06Q 10/067* (2013.01); *G06Q 10/10* (2013.01); *G06F 9/451* (2018.02)

(58) Field of Classification Search
CPC ...... G06Q 40/12; G06Q 10/067; G06Q 10/10; G06Q 40/123; G06F 9/451; G06N 7/005; G06N 20/20
(Continued)

(56) References Cited

U.S. PATENT DOCUMENTS 8,095,436 B1 1/2012 Shah et al.
9,558,521 B1 * 1/2017 Eftekhari ............... G06Q 40/10
10,579,721 B2 * 3/2020 Mukherjee ............ G06F 40/205
(Continued)

OTHER PUBLICATIONS

IRS Computer Document Matching Program, Sep. 4, 2013 (2 pages) http://www.certifiedproactiveaccounting.com/irs-computer-document-matching-program.

*Primary Examiner* — Andrew Joseph Rudy
(74) *Attorney, Agent, or Firm* — Ferguson Braswell Fraser Kubasta PC

(57) ABSTRACT

A system for account mapping includes functionality for obtaining more than one labeled accounts labeled by more than one accountant; pre-processing more than one labeled accounts using natural language processing, using the more than one pre-processed labeled accounts to train an account mapping model that performs multinomial classification; receiving an account name from an accounting application where the account name includes a text label for an account included in a chart of accounts; generating an account mapping by applying the account mapping model to the account name, where the account mapping includes a type of the account, a sub-type of the account, a code, and a series associated with an accounting form; returning the account mapping to the accounting application through an Application Programming Interface (API); and receiving a corrected account mapping from an accountant and using the corrected account mapping as a new text label to incrementally update the account mapping model.

10 Claims, 9 Drawing Sheets

(51) Int. Cl.
*G06Q 10/067* (2023.01)
*G06F 9/451* (2018.01)
(58) Field of Classification Search
USPC .......................................................... 705/30
See application file for complete search history.

(56) References Cited

U.S. PATENT DOCUMENTS

| | | | | |
|---|---|---|---|---|
| 2008/0147528 A1* | 6/2008 | Talan | ................... | G06F 40/174 |
| | | | | 705/31 |
| 2011/0258195 A1* | 10/2011 | Welling | ............... | G06V 30/182 |
| | | | | 707/E17.09 |
| 2016/0019197 A1* | 1/2016 | Iasi | ...................... | G06F 40/174 |
| | | | | 715/224 |

* cited by examiner

TaxPro – Mapping Reviser

| | TYPE | SUB-TYPE | SERIES | CODE |
|---|---|---|---|---|
| Office Equipment | Expense | OtherMiscellaneousServiceCost | 38 | Box 34 |
| | | | | Box 35 |
| Checking Account | Bank | Checking | | Box 36 |
| | | | | Box 37 |
| Savings Account | Bank | Savings | | |
| Payroll Clearing (owner's time) | Expense | OtherMiscellaneousServiceCost | 25 | 3 |
| Petty Cash Account | Bank | CashOnHand | 50 | 2 |
| Accounts Receivable | AccountsReceivable | AccountsReceivable | 51 | 18 |
| *Inventory Asset | OtherCurrentAsset | OtherCurrentAssets | 51 | 20 |
| Prepaid Insurance | Expense | OtherMiscellaneousServiceCost | 51 | 21 |
| Accumulated Depreciation | Fixed Asset | AccumulatedDepreciation | 49 | 18 |
| Master Card Payable | Credit Card | CreditCard | | |

460 (dropdown)
453, 454, 455, 456

[ CANCEL ]  [ SAVE ]

FIG. 4B

AUTOMATED FIELD-MAPPING OF ACCOUNT NAMES FOR FORM POPULATION

CROSS-REFERENCE TO RELATED APPLICATION

The present application is a divisional application of and, thereby, claims benefit under 35 U.S.C. § 120 to U.S. application Ser. No. 15/472,266, entitled, "AUTOMATED FIELD-MAPPING OF ACCOUNT NAMES FOR FORM POPULATION," filed on Mar. 28, 2017, having the same inventors, and incorporated herein by reference.

BACKGROUND

Modern business entities rely on accounting software to manage and inform their business activities. Such accounting software collects, stores, and processes data regarding financial transactions, such as purchases and income, and then generates output that may be used by business management. Often, great efforts are expended to ensure the accuracy of the data that is input to the accounting software, so that the outputs of the accounting software are trustworthy and informative.

One such output includes a trial balance report. A trial balance report identifies one or more accounts of a business, and includes the debits and credits of the business for each account for a given period of time, and may be used to ensure that all journal entries are balanced, and to ensure the general accuracy of financial statements of the business. As a result, a trial balance report can be a valuable starting place for tax preparation activities. However, due to differences in bookkeeping practices and jurisdictional requirements, it can be incredibly difficult to directly employ the contents of a trial balance report in tax preparation activities. As a result, it often takes hours of time to prepare a trial balance report and transfer its contents to tax preparation software.

SUMMARY

In general, in one aspect, the invention relates to a method for account mapping. The method includes obtaining a plurality of labeled accounts labeled by a plurality of accountants. The method also includes pre-processing the plurality of labeled accounts using natural language processing. The method also includes training, using the plurality of pre-processed labeled accounts, an account mapping model that performs multinomial classification. The method also includes receiving, from an accounting application, an account name. The account name is received through an application programming interface (API). The account name comprises a text label for an account included in a chart of accounts. The method also includes generating an account mapping by applying the account mapping model to the account name. The account mapping includes a type of the account, a sub-type of the account, a code, and a series associated with an accounting form. The method also includes returning the account mapping to the accounting application through the API. The method also includes receiving a corrected account mapping from an accountant and using the corrected account mapping as a new text label to incrementally update the account mapping model.

In general, in one aspect, the invention relates to a system for account mapping. The system includes a hardware processor, memory, and software instructions stored in the memory and configured to execute on the hardware processor, which, when executed by the hardware processor, cause the hardware processor to obtain a plurality of labeled accounts labeled by a plurality of accountants, pre-process the plurality of labeled accounts using natural language processing, train, using the plurality of pre-processed labeled accounts, an account mapping model that performs multinomial classification, receive, from an accounting application, an account name, where the account name is received through an application programming interface (API) and where the account name comprises a text label for an account included in a chart of accounts, generate an account mapping by applying the account mapping model to the account name, where the account mapping includes a type of the account, a sub-type of the account, a code, and a series associated with an accounting form, return the account mapping to the accounting application through the API, and receive a corrected account mapping from an accountant and using the corrected account mapping as a new text label to incrementally update the account mapping model.

Other aspects of the invention will be apparent from the following description and the appended claims.

BRIEF DESCRIPTION OF DRAWINGS

FIGS. 4A and 4B show examples of automated field-mapping of account names using machine learning for automated form population, in accordance with one or more embodiments of the invention.

DETAILED DESCRIPTION

Figure 1A:
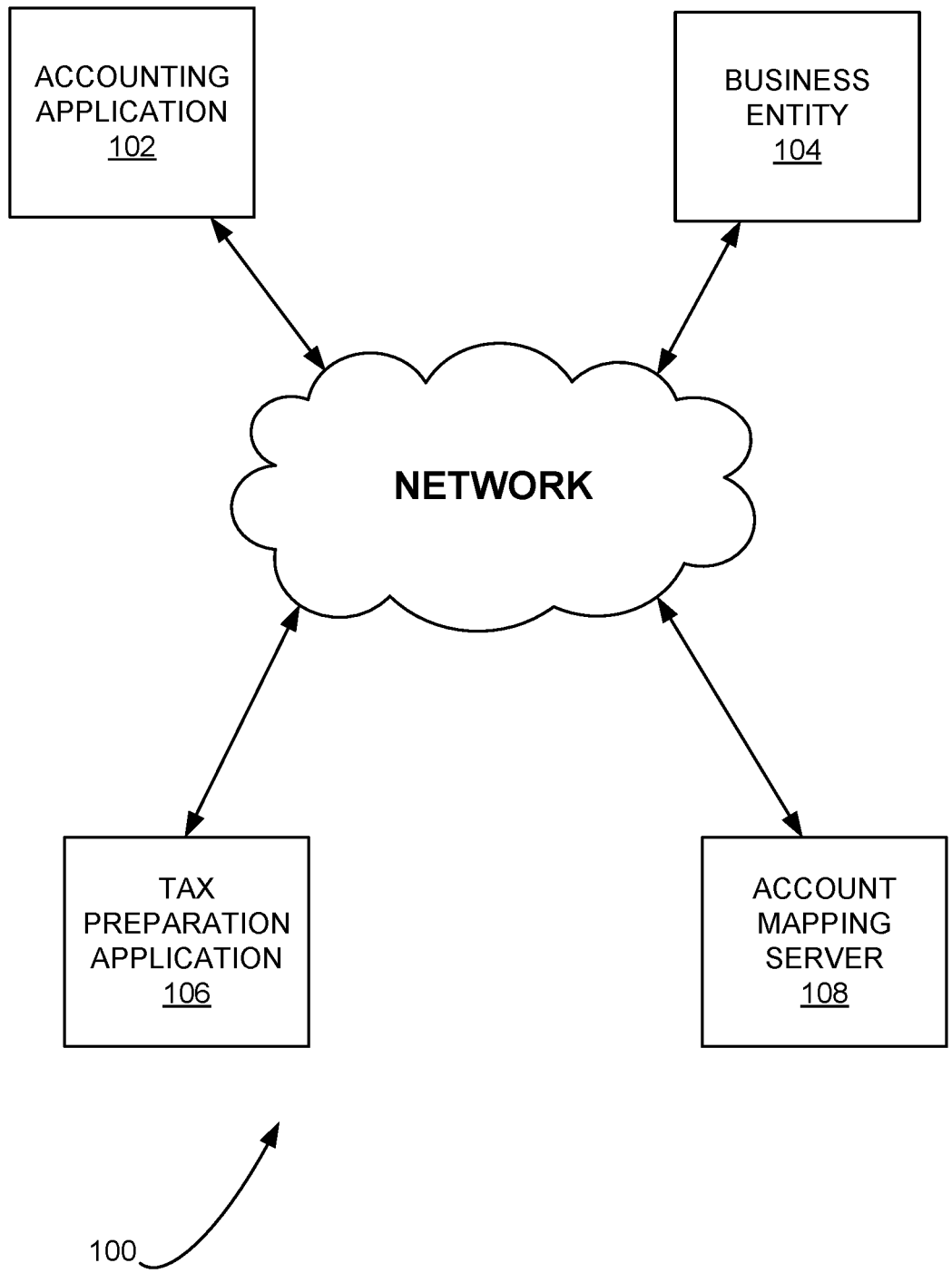
FIGS. 1A, 1B, and 1C show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Often, the process of transferring data from a bookkeeping or accounting software to a tax form or tax preparation software is a laborious and time-intensive process. At least part of the challenge with this process is due to the fact that some companies create unconventional charts of accounts, or name some accounts in an unconventional manner. For example, during day-to-day business management, a business owner or employee may enter information into the business's chart of accounts in a manner that is informative for their own purposes, but unfortunately does not provide any meaningful insight to others outside the business. For example, a business owner or bookkeeper may include personal notes, abbreviations, random character strings, or other equally uninformative text within a business's chart of accounts. Unfortunately, such information may make it difficult to perform an automated migration of the associated values into other destinations, such as populating tax-related software and tax forms.

Described herein are systems and methods for using a machine learning model of manually mapped data to automate the mapping of account names in a meaningful way. Moreover, the mapping of account names may identify the exact location that a value associated with an account may be used within a tax form and related software. As a result, for example, the contents of a trial balance report may be effortlessly transferred into a tax form, thereby automating some aspect of tax preparation activities. Thus, the systems and methods described herein may operate to unlock knowledge that is currently held only in the personal computers of accountants, bookkeepers, and professional tax preparers. Moreover, a feedback system may be implemented to enable the improvement of the model over time, based on user modifications to the mappings. As a result, the systems and methods described herein may automate tax preparation activities in an increasingly efficient manner.

FIG. 1A depicts a schematic block diagram of a system (100) for automated field-mapping of account names using machine learning for automated form-filling, in accordance with one or more embodiments of the invention. In one or more embodiments of the invention, one or more of the elements shown in FIG. 1A may be omitted, repeated, and/or substituted. Accordingly, embodiments of the invention should not be considered limited to the specific arrangements of modules shown in FIG. 1A.

As shown in FIG. 1A, the system (100) includes an accounting application (102), a tax preparation application (106), an account mapping server (108), and a business entity (104). The accounting application (102), tax preparation application (106), account mapping server (108), and business entity (104) are communicatively coupled via one or more computer networks. As non-limiting examples, the computer network(s) may include wired and/or wireless portions of public and/or private data networks, such as wide area networks (WANs), local area networks (LANs), the Internet, etc.

As described, the business entity (104) includes any individual or business actively engaged in the pursuit of commercial objectives (i.e., running a business). The business entity (104) may be an individual, a corporation, a sole proprietorship, a partnership, an S corporation, a C corporation, a limited liability company, cooperative, etc. In one or more embodiments, the business entity (104) may be engaged in the financial services industry. For example, the business entity (104) may be an individual or corporation that is engaged in the for-profit preparation of tax documents, such as tax filings, tax returns, etc. More specifically, the business entity (104) may be an accountant, or firm of accountants, that specializes in the preparation and filing of tax returns and income tax documents. In one or more embodiments, the business entity (104) may include hardware and software for accessing the accounting application (102), the tax preparation application (106), and/or the account mapping server (108). For example, the business entity (104) may include a desktop computer, portable computer (e.g., laptop, netbook, etc.), or mobile device (e.g., tablet computer, cellular phone, smartphone, etc.), etc.

As described, the accounting application (102) includes computational hardware and software that executes processes for recording and processing accounting transactions. The accounting application (102) may include functionality for: recording data as accounts receivable, recording data as accounts payable, maintaining a general ledger, generating invoices or bills, tracking inventory, ordering inventory, recording orders, recording collection activities, and/or recording payment activities. The accounting application (102) may be accessible to the business entity (104) for performing such activities on behalf of the business entity (104) itself, and/or on behalf of other businesses. In one or more embodiments, the accounting application (102) may be a cloud-based accounting application or a multi-user online accounting service.

In one or more embodiments, the accounting application (102) is operable to create a trial balance report. A trial balance report may include the debits and credits of a business for a given period of time, and is used to ensure that all journal entries are balanced, as well as to ensure the general accuracy of financial statements of the business. In one or more embodiments, the trial balance report is formatted as a table containing rows and columns, or as a file containing a sequence of comma separated values (CSV). However, such examples are intended to be non-limiting, and it is understood that a trial balance report may be formatted in any suitable manner.

Also, the tax preparation application (106) includes computational hardware and software that executes processes for generating, preparing, or completing tax-related documents. For example, the tax preparation application (106) includes functionality for filling out standardized tax forms for filing with a government entity. The tax preparation application (106) may be accessible to the business entity (104) for performing such activities on behalf of the business entity (104) itself, and/or on behalf of other businesses.

In one or more embodiments, the account mapping server (108) includes computational hardware and software that executes processes for applying an account mapping model to received account information. To this end, an account mapping service resides on the account mapping server (108), as described below. The account information may include one or more account names, such as, for example, a list of account names included in or originating from a trial balance report or a chart of accounts. In response to receiving an account name, the account mapping server (108) returns an account mapping. As described below, the account mapping for a given account name includes a type, a sub-type, a series, a code, and/or a confidence value (e.g., a probability that the mapping is accurate).

Figure 1B:
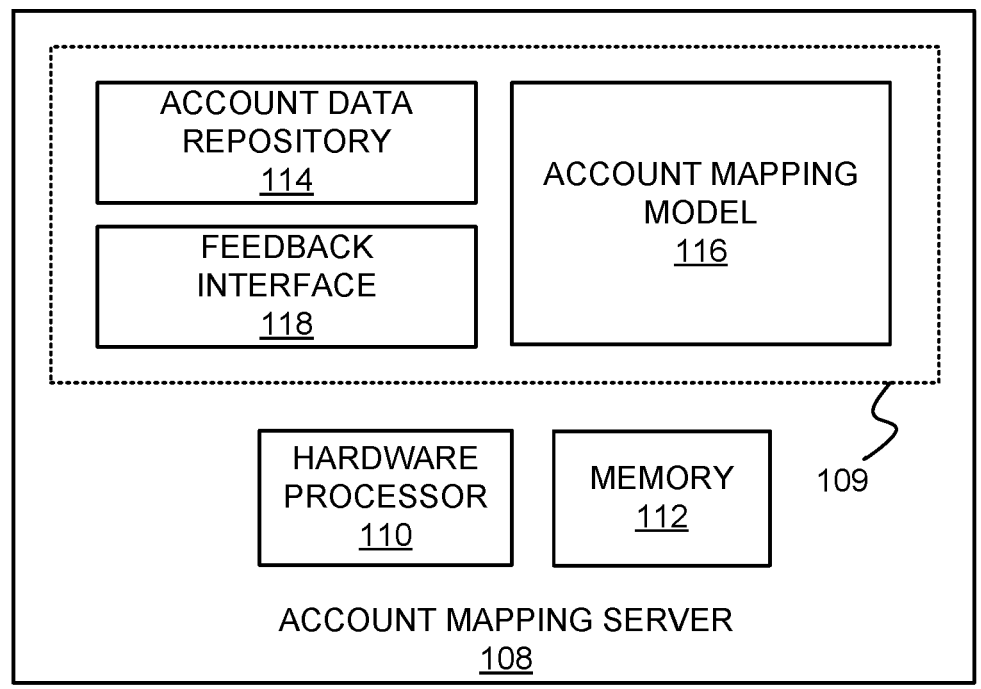

FIG. 1B depicts another view of the account mapping server (108), in accordance with one or more embodiments of the invention. In one or more embodiments of the invention, one or more of the elements shown in FIG. 1B may be omitted, repeated, and/or substituted. Accordingly, embodiments of the invention should not be considered limited to the specific arrangements of modules shown in FIG. 1B.

As depicted in FIG. 1B, the account mapping server (108) includes a hardware processor (110), memory (112), and an account mapping service (109). The account mapping service (109) is illustrated to include an account data repository (114), an account mapping model (116), and a feedback interface (118).

In one or more embodiments, the account data repository (114) stores account data received from one or more clients. The clients may include a tax preparation application, an accounting application, and/or the device of a business. Thus, the account data repository (114) may include account information such as one or more account names. In one or more embodiments, the account data is formatted as a chart of accounts or a trial balance. Further, the account data may be received in any suitable format. For example, the account data is formatted as a spreadsheet or table containing rows and columns, as text containing a sequence of comma separated values (CSV), or another character delimited formatted.

The account mapping service (109) applies the account mapping model (116) to received account information. More specifically, the account mapping service (109) applies the account mapping model (116) to account data stored in the account data repository (114). Accordingly, in response to the account mapping server (108) receiving an account name, or a list of account names, from another device or service, the account name or list of account names may be stored at the account data repository (114). Moreover, as described below the account mapping service (109) applies the account mapping model (116) to the account name or list of account names stored at the account data repository (114), and generates an account mapping for each account name. The account mapping for a given account name may include one or more of a type, a sub-type, a series, a code, and a confidence value. In this way the account mapping model (116) classifies text labels (i.e., account names). The classifications are used for automated form-completion purposes. After generating the mapping for an account name, the account mapping service (109) removes the account name from the account data repository (114).

In one or more embodiments, the account data repository (114) includes multiple different storage units and/or devices. The multiple different storage units and/or devices may or may not be of the same type or located at the same physical site.

In one or more embodiments, a given company records transactions within a general ledger. The general ledger is divided into various account types at a first or top hierarchical level. The accounts may be listed in a chart of accounts. Accordingly, as used herein, a "type" is a generally recognized or accepted label that may be applied to a top-level account, such as, for example, "assets," "equipment," "property," "current liabilities," "long-term liabilities," "equity," "operating revenues," "marketing expenses," etc. Further, a "sub-type" includes any label applied to an account that is hierarchically located under a first or top hierarchical level account type. For example, the "assets" type may be further divided into sub-types of: "cash," "petty cash," "accounts receivable," "inventory," "supplies," etc.

As used herein, a "series" includes any identifier of a discrete destination. In one or more embodiments, the destination is a software product, such as a tax preparation product. In this way, the series returned in a mapping identifies a software product that accepts as input an account name or value associated with the account name used generates the mapping. In one or more embodiments, the destination is a form, such as a tax form. The tax form may be a proprietary document, created by an individual, accountant, or business, or the tax form may be a standard tax form that has been made available by a governmental agency. For example, the form may include a form to report income or loss from a business (e.g., IRS form Schedule C), a form to report income or loss from farming (e.g., IRS form Schedule F), or a form to report income or loss from rental real estate (e.g., IRS form Schedule E). In this way, the series returned in a mapping identifies a form or other document that accepts as input an account name or value associated with the account name that was used generate the mapping. The value may include, for example, a monetary value (e.g., dollar value), such as a credit or a debit associated with the account.

Still further, as used herein, a "code" includes any further limiting identifier of the discrete destination identified by the series. For example, as noted above, the series identifies a software product. In such an example, the code may identify a field or user interface element (e.g., text box, text field, button, etc.) within the software product that receives the input of the account name or value. Also, as noted above, the series identifies a form, such as a tax form. Accordingly, in such an example, the code may identify a field, line, or box within the form that receives the input of the account name or value.

The series and code determined for an account may be based on the account type and sub-type determined for that account. In other words, the account mapping model (116) first determines a type of an account, and then a sub-type of the account based on an account label or account name. Further, based on the type and sub-type, the account mapping model (116) then maps the type and the subtype to a code (e.g., a text field in form) and series (e.g., a software product), using a pre-determined mapping The account type and sub-type may be used by an accounting application during the performance of bookkeeping functions.

The series and/or code returned by a mapping may be used to automate the population of a form. For example, the tax preparation application (106) described in the context of FIG. 1A utilizes such a mapping to populate any of the forms noted above, or any other form. In this way, the output from an accounting application, such as the accounting application (102) is used to automate the preparation of tax documents, while requiring little to no user interaction.

Also, as used herein, a confidence value includes any value associated with a mapping generated by the account mapping model (116) that quantifies the expected accuracy or truth of the mapping. In one or more embodiments, the confidence value may be, for example, a value between 0 and 1 or a percentage. In one or more embodiments, the confidence value is a probability.

In one or more embodiments, account data received from a client includes an identification of a series. In other words, the account data received from a client may include an account name and a mapping destination, such as a form or software product. For example, a user at a client indicates, within a tax preparation product, that a particular chart of accounts should be used to fill out or populate a particular tax form. Accordingly, the account data repository (114) stores a series received from the client. Moreover, application of the account mapping model (116) by the account mapping service (109) to the account data utilize the series provided by the client.

In one or more embodiments, the account mapping service (109) is implemented as a web service-based application program interface (API). For example, the account mapping server (109) may be an HTTP-based RESTful API.

Accordingly, the account mapping service (109) may respond to standard HTTP methods (e.g., GET, PUT, POST, etc.). For example, the account mapping service (109) receives account information as a POST method. In one or more embodiments, the account mapping service (109) receives the account information from the accounting application (102) or the tax preparation application (106), both described in the context of FIG. 1A. Of course, however, the account mapping service (109) may be accessed by any network-connected device. In this way, the account mapping server (109) is leveraged by other services, applications, and devices not depicted in FIG. 1A for obtaining an account mapping.

In addition, the account mapping server (108) is depicted to include a feedback interface (118). The feedback interface (118) receives feedback on any mappings generated by the account mapping model (116). For example, after generating a mapping for an account name, the mapping is provided to a tax preparation application. As noted above, the mapping includes a type, a sub-type, a series, and a code. At the tax preparation application, a user (e.g., an accountant) may modify any of the type, the sub-type, the series, and the code. For example, the user indicates that the sub-type for the account name should be something other than what was identified in the mapping. As another example, the user indicates that the code is incorrect, and a dollar value associated with the mapped account should be inserted into a different field or box within a form identified by the series. Accordingly, the feedback interface (118) is operative to receive such modifications.

In one or more embodiments, in response to receiving the modifications, the feedback interface (118) updates the account mapping model (116). In other words, the feedback interface (118) uses the modifications to improve the account mapping model (116). As an option, the user modifications are used as labels to retrain the account mapping model (116). In one or more embodiments, the user modifications are upsampled to increase a bias for those modifications within the account mapping model (116). As another option, the feedback interface (118) uses the user modifications as labels to incrementally update the account mapping model (116). In this way, user feedback on mappings is used to continually improve the account mapping model (116). Consequently, the utility and efficiency of the account mapping service (109), for migrating accounting data from accounting software to tax preparation software and tax forms, may be expected to increase with use over time.

In one or more embodiments, the hardware processor (110) includes functionality to execute logic of the account mapping service (109) and the feedback interface (118). Moreover, logic of the account mapping service (109) and the feedback interface (118) may reside in the memory (112) during the execution. In one or more embodiments, the account mapping server (108) includes hardware components (not shown) for enabling communication between the hardware processor (110), the memory (112), the feedback interface (118), the account mapping service (109), etc. For example, the account mapping server (108) includes a system bus for communication between the various elements.

In one or more embodiments, the account mapping model (116) is a single model that outputs at least a type and a sub-type for a given account based on an account name input. However, as the number of possible types within the model increases, the performance or accuracy of the model's classification may decrease. According, use of the multi-level model described below as the account mapping model (116) may improve the overall accuracy of the account mapping service (109).

Figure 1C:
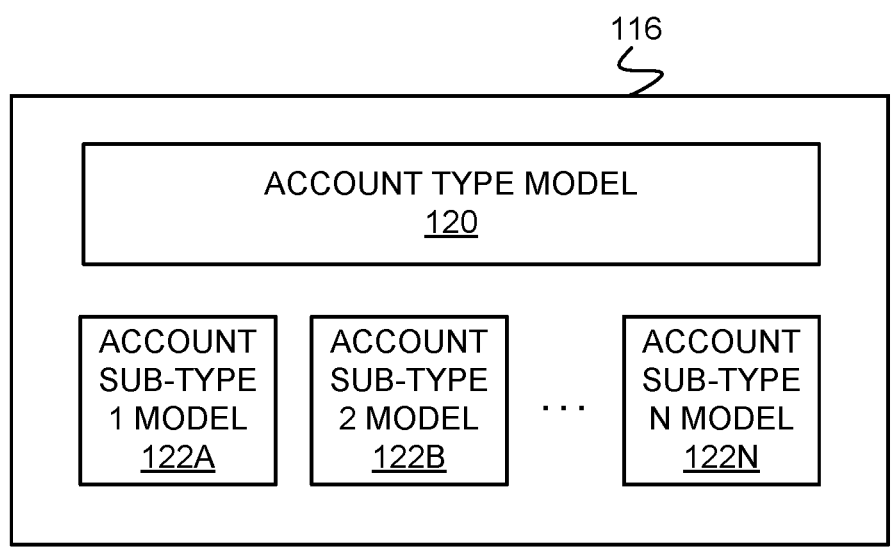

Thus, in one or more embodiments, the account mapping model (116) includes a multi-level model. For example, referring to FIG. 1C, the account mapping model (116) is depicted as a multi-level model. In particular, as shown in FIG. 1C, the account mapping model (116) includes an account type model (120), as well as multiple account sub-type models (122). More specifically, the account sub-type models are depicted to include a first account sub-type model (122A), a second account sub-type model (122B), and a third account sub-type model (122N). For purposes of simplicity and clarity, only three account sub-type models (122) are depicted in FIG. 1C, however it is understood that the account mapping model (116) may include tens or hundreds or more of account sub-type models (122). Of course, in one or more embodiments of the invention, one or more of the elements shown in FIG. 1C may be omitted, repeated, and/or substituted. Accordingly, embodiments of the invention should not be considered limited to the specific arrangements of modules shown in FIG. 1C.

In one or more embodiments, each type of account identified within a chart of accounts includes multiple sub-categories. Accordingly, the account type model (120) may predict with a minimum confidence score a type of a given account, based on, for example, the account name. After predicting the type of the account, an account sub-type model (122) for that particular type may be used to identify a particular sub-type of the account.

Examples of types that may be identified by the account type model (120) include: income, bank, expense, accounts receivable, fixed asset, current asset, current liability, cost of goods sold, and credit card. Exemplary sub-types that may be identified by an account sub-type model (122) for the bank type include: checking account, cash on hand, and savings account. An exemplary sub-type that may be identified by an account sub-type model (122) for the expense type includes: miscellaneous service costs. An exemplary sub-type that may be identified by an account sub-type model (122) for the current asset type includes: inventory and other current assets. An exemplary sub-type that may be identified by an account sub-type model (122) for the fixed asset type includes: accumulated depreciation. An exemplary sub-type that may be identified by an account sub-type model (122) for the current liability type includes: accumulated depreciation.

Figure 2A:
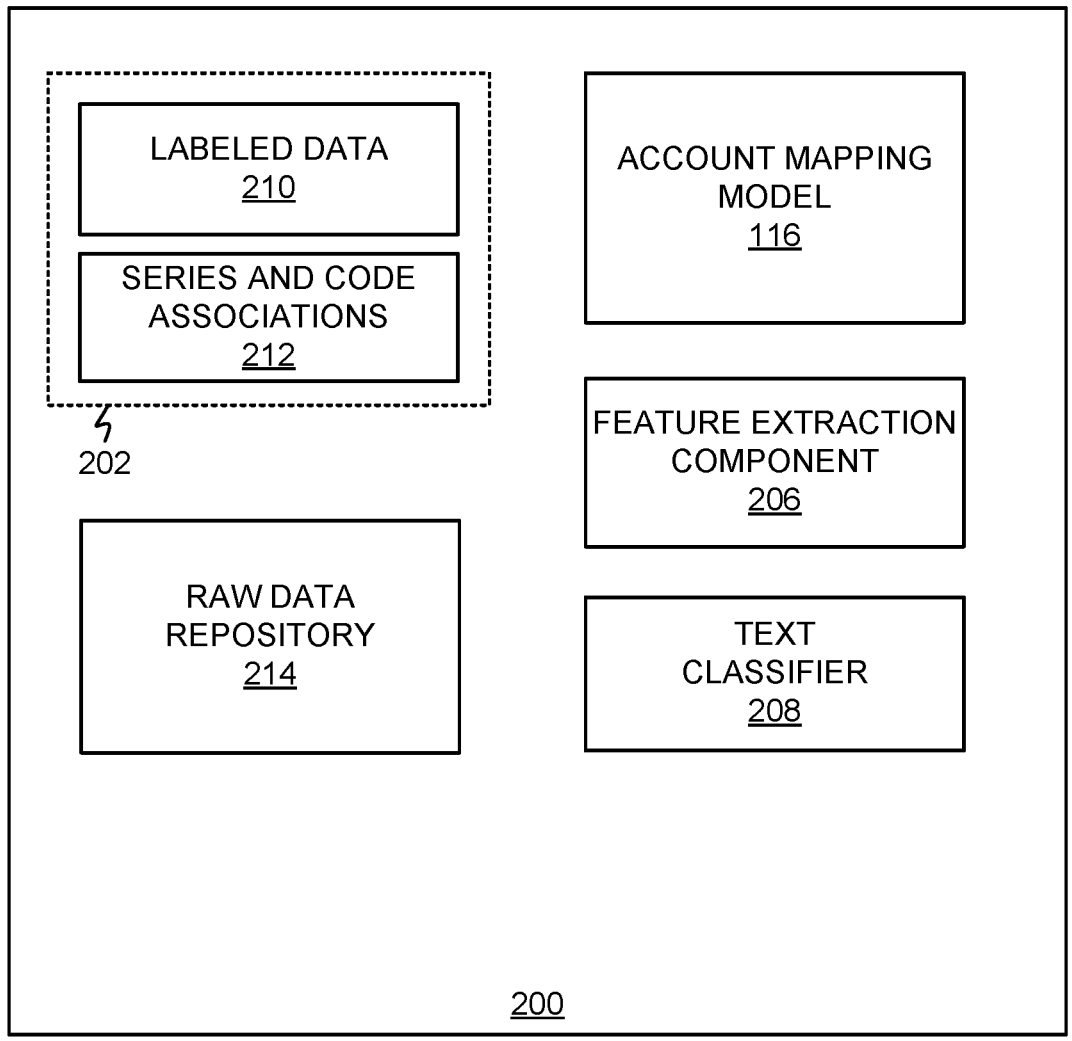
FIGS. 2A and 2B show a system in accordance with one or more embodiments of the invention.
Figure 2B:
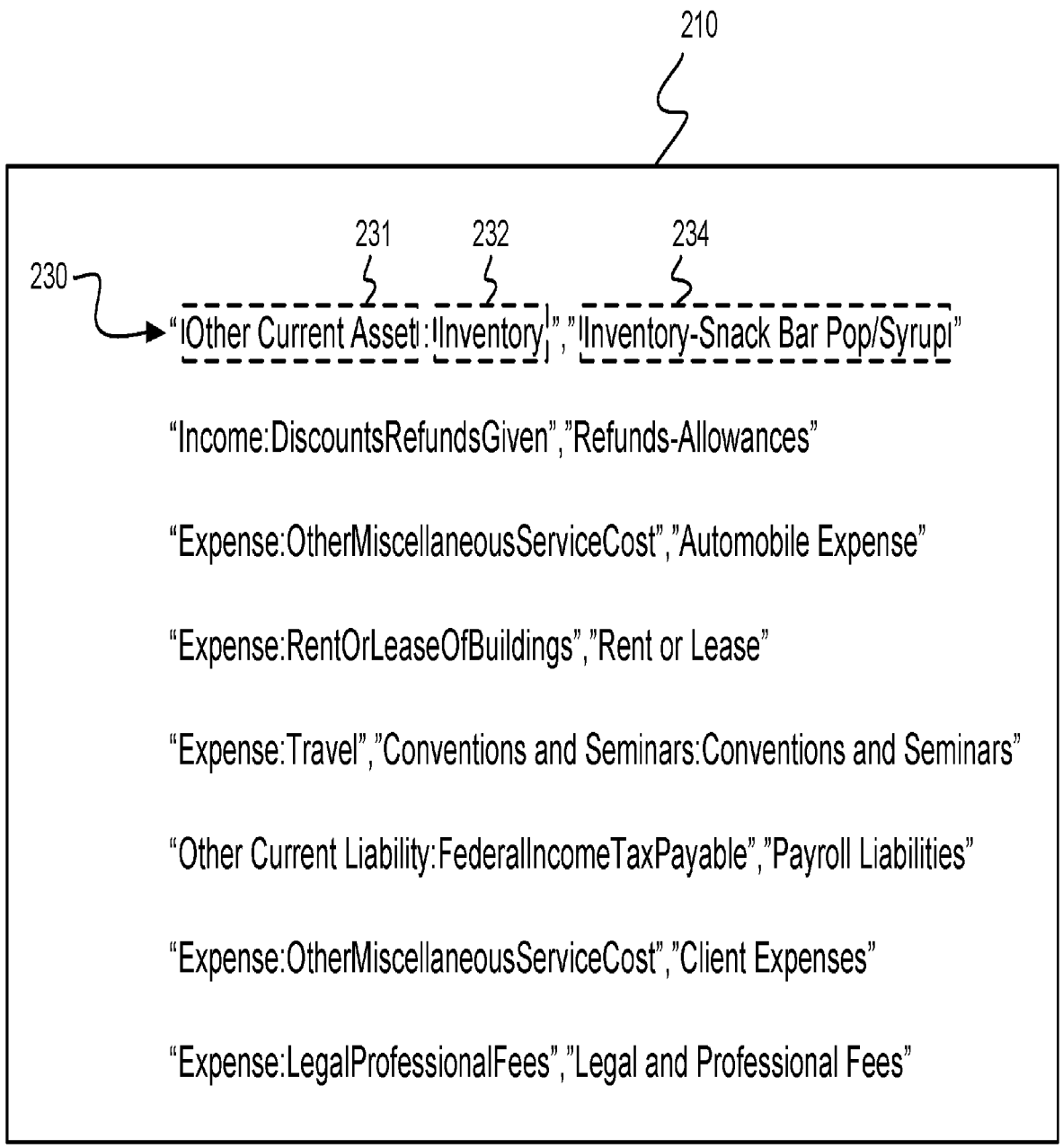

FIG. 2A depicts a view of a system (200) for generating an account mapping model, in accordance with one or more embodiments of the invention. In one or more embodiments of the invention, one or more of the elements shown in FIG. 2B may be omitted, repeated, and/or substituted. Accordingly, embodiments of the invention should not be considered limited to the specific arrangements of modules shown in FIG. 2A. In one or more embodiments, the elements depicted and described relative to FIG. 2A may be present in the account mapping server (108) of FIGS. 1A and 1B. In other words, the account mapping model (116) may be generated and maintained on the server (108), where it remains accessible for generating mappings.

As illustrated in FIG. 2A, the system (200) includes a raw data repository (214), a mapping data repository (202), a feature extraction component (206), and a text classifier (208), which are used to build the account mapping model (116), described above.

In one or more embodiments, the raw data repository (214) stores any data reflecting the usage of an accounting application and/or a tax preparation application. For example, the raw data repository (214) stores usage data regarding the creation and maintenance of charts of accounts by various business entities. Such usage data includes account names, transaction activities within the accounts, and debits and balances from such accounts. The raw data repository (214) stores usage data regarding the tax preparation activities within a tax preparation application, such as, for example, the completion of tax filings and tax documents. More specifically, the raw data repository (214) includes usage data that indicates how the contents (e.g., debit values, credit values, etc.) of a trial balance output by an accounting application may be migrated or mapped to fields of a tax form. The usage data maintained at the raw data repository (214) may be received directly from an accounting application and/or tax preparation application, or it may be received via any other mechanism. In one or more embodiments, the source of the usage data is restricted to a certain population of users, in order to increase the validity of the usage data. For example, the usage data in the raw data repository (214) includes only mappings that have been created by accountants within a particular tax preparation application. The raw data repository (214) includes multiple different storage units and/or devices. The multiple different storage units and/or devices may or may not be of the same type or located at the same physical site.

Still further, the system (200) generates the account mapping data (202) based on the raw data repository (214). In one or more embodiments, the account mapping data (202) is a portion of the raw data repository (214) that has been cleansed and/or pruned. For example, the raw data repository (214) includes account names that contain undesirable characters, such as numerical values or special characters (e.g., '@', '#', '^'). Accordingly, the account mapping data (202) is generated by removing such characters, or removing those account names from the data all-together. In one or more embodiments, words that originate from outside of, or are unknown within, a specific language may be removed. For example, all non-English words, or all account names containing non-English words, are removed in generating the account mapping data (202) from the contents of the raw data repository (214).

Accordingly, the account mapping data (202) includes labeled data (210), and series and code associations (210). The labeled data (210) includes numerous labeled accounts names. For example, referring to FIG. 2B, the labeled data (210) is shown to include an account record (230) that includes an account type (231) and account sub-type (232) attached to an account name (234). In particular, the account record (230) includes an account type (i.e., "Other Current Asset") and an account sub-type (i.e., "Inventory") attached to an account name (i.e., "Inventory-Snack Bar Pop/Syrup"). Various other account records are also shown included in the labeled data (210) (e.g., the account type "Expense" and account sub-type "RentOrLeaseOfBuildings" are attached to the account name "Rent or Lease"). As noted above, the account records (230) may be received in usage data from an accounting application and/or a tax preparation application. In other words, each of the account records (230) indicates mappings that have been created manually, by users.

Referring still to FIG. 2A, the account mapping data (202) includes series and code associations (212). The series and code associations includes any data that indicates how a value associated with an account name, type, and/or sub-type has been used in (i.e., mapped to) a field, user interface element, line, or box within a destination, such as a tax form or software product. The value may be, for example, a debit or credit value from a trial balance.

The feature extraction component (206) generates numerical feature vectors from the contents of the account mapping data (202). In one or more embodiments, the feature extraction component (206) generates the feature vectors using a bag of words model or term frequency-inverse document frequency (tf-idf). The feature extraction component (206) outputs, for each word found within the account names of the account mapping data (202), an index value that corresponds to the frequency of the word in the account mapping data (202).

The text classifier (208) includes any classification algorithm that may train the account mapping model (116) based on the output of the feature extraction component (206). Accordingly, the text classifier (208) classifies labels from the labeled data (210) of the account mapping data (202) based on the output of the feature extraction component (206). In one or more embodiments, the text classier (208) includes a multinomial Naïve Bayes classifier.

In one or more embodiments, the account mapping model (116) is built using any suitable machine learning library. For example, the account mapping model (116) is built using the Python language. In particular, the feature extraction component (206) and text classifier (208) may be implemented using Python libraries and toolkits, such as, for example, Numpy, SciPy, Pandas, and/or Scikit-learn. As another example, the account mapping model (116) may be built using the MLlib machine learning library from Apache Spark™.

In one or more embodiments, the account mapping data (202) is divided into a training dataset and a testing dataset. In such embodiments, the training dataset is used by the text classifier (208) and feature extraction component (206) to build the account mapping model (116). After building the account mapping model (116), the account mapping model (116) is tested using the testing dataset. The account mapping data (202) may include millions of accounts obtained from a massively-multiuser online accounting service and may be processed using a cluster of servers running distributed computing software, e.g., based on a Map-Reduce architecture.

Figure 3A:
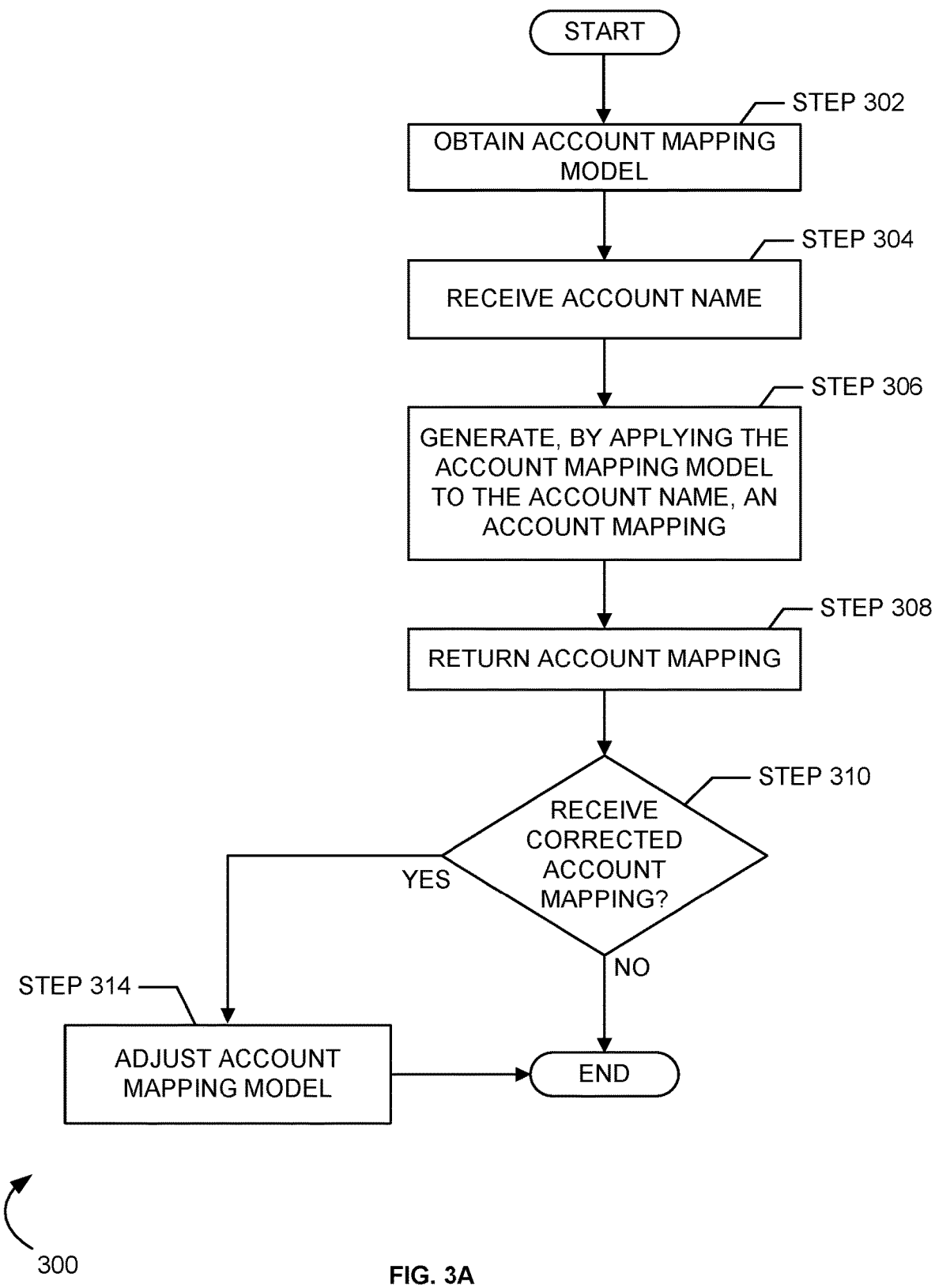
FIGS. 3A and 3B show methods performed in accordance with one or more embodiments of the invention.

FIG. 3A depicts a flowchart of a method (300) for automated field-mapping of account names using machine learning for automated form-filling, in accordance with one or more embodiments of the invention. In one or more embodiments, one or more of the steps shown in FIG. 3A may be omitted, repeated, and/or performed in a different order. Accordingly, embodiments of the invention should not be considered limited to the specific arrangements of steps shown in FIG. 3A. In one or more embodiments, the method (300) described in reference to FIG. 3A may be practiced by the account mapping server (108) described in reference to FIGS. 1A-1B, above, and/or involving the computing system (500) described in reference to FIG. 5A.

As shown in FIG. 3A, an account mapping model is obtained at Step 302. The account mapping model models how a value associated with an account name may be used in another destination. In one or more embodiments, the account mapping model have previously been generated by the system (200) described in the context of FIG. 2A.

At Step 304, an account name is received from a client. The account name includes a text label for an account. For example, the account name may be from a chart of accounts or a trial balance of a business entity. In one or more embodiments, the client is a tax preparation application or an accounting application. For example, a tax preparation application provides one or more account names that it has extracted from a trial balance of a business entity. In one or more embodiments, multiple account names are received from the client at Step 304. For example, the client may send a listing of a chart of accounts, or the account names identified within a trial balance report.

In one or more embodiments, an identifier of a destination may be received with the account name at Step 304. For example, in one or more embodiments, an identifier of a tax form or software product is received with the account name. The identifier of the destination may be used as input to a mapping operation to increase the confidence of a result, or to validate a result of the mapping. For example, if the destination is indicated as a farming income tax form, then certain potential mappings are restricted from the ultimate result.

Also, at Step 306, an account mapping is generated by applying the account mapping model to the account name. Application of the account mapping model may include any operation that results in the account mapping model outputting one or more of an account type, an account sub-type, a code, a series, and a confidence value. In particular, the account type may be a top or first level classification of the account name received at Step 304; and the account sub-type may be a second level classification of the account name received at Step 304. Also, the series may identify a destination for a value associated with the account name, such as a form or software product that will receive the value associated with the account; and the code may identify a specific location within the destination, such as a field or box, that will receive the value associated with the account. The confidence value may be any value representative of the accuracy of the mapping.

Of course, if multiple account names are received at Step 304, such as, for example, as a trial balance report, then the account mapping model is applied to each of the account names. In other words, an account type, account sub-type, code, series, and/or confidence value may be returned for each received account name.

After the mapping is generated, the mapping is returned to the client at Step 308. The mapping may be returned over a network, such as the Internet. If the user (e.g., an accountant) of the client decides that the account mapping is correct, then no further input is received from the client. In other words, the client utilizes the mapping to transfer a value associated with the account name to a document or form. For example, if the client is a tax preparation application, and the account name is "Truck Repairs," which is associated with a debit of $2,500 in a trial balance report, then the account name is mapped to the type "expense," as well as a sub-type of the expense type. Moreover, the mapping of the account name of "Truck Repairs" identifies a profit or loss tax form via a series, as well as a field within the tax form via a code. Accordingly, using the series and code of the mapping, the tax preparation application transfers (e.g., populates) the value of $2,500 to the field identified by the code within the form identified by the series. If the value is transferred to the field without any user correction, then no further input may be received. Accordingly, it may be determined, at Step 310, that no corrected account mapping is received, and the method (300) ends.

However, if it is determined at Step 310 that a corrected account mapping has been received from the user, then the method (300) proceeds to Step 314, where the account mapping model is adjusted. The corrected account mapping may include a user modification to the type, sub-type, series, and/or code of the mapping. The account mapping model is adjusted by, for example, by periodically retraining the model with batches of corrected account mappings, by periodically retraining the model using upsampling, or by incrementally updating the account mapping model, e.g., in real time or near real time using stream processing. After the account mapping model has been adjusted, the method (300) ends. In this regard, it will be appreciated that the correction is a label provided by an expert (e.g., an accountant) similar to the labels that were originally used to train the account mapping model.

Figure 3B:
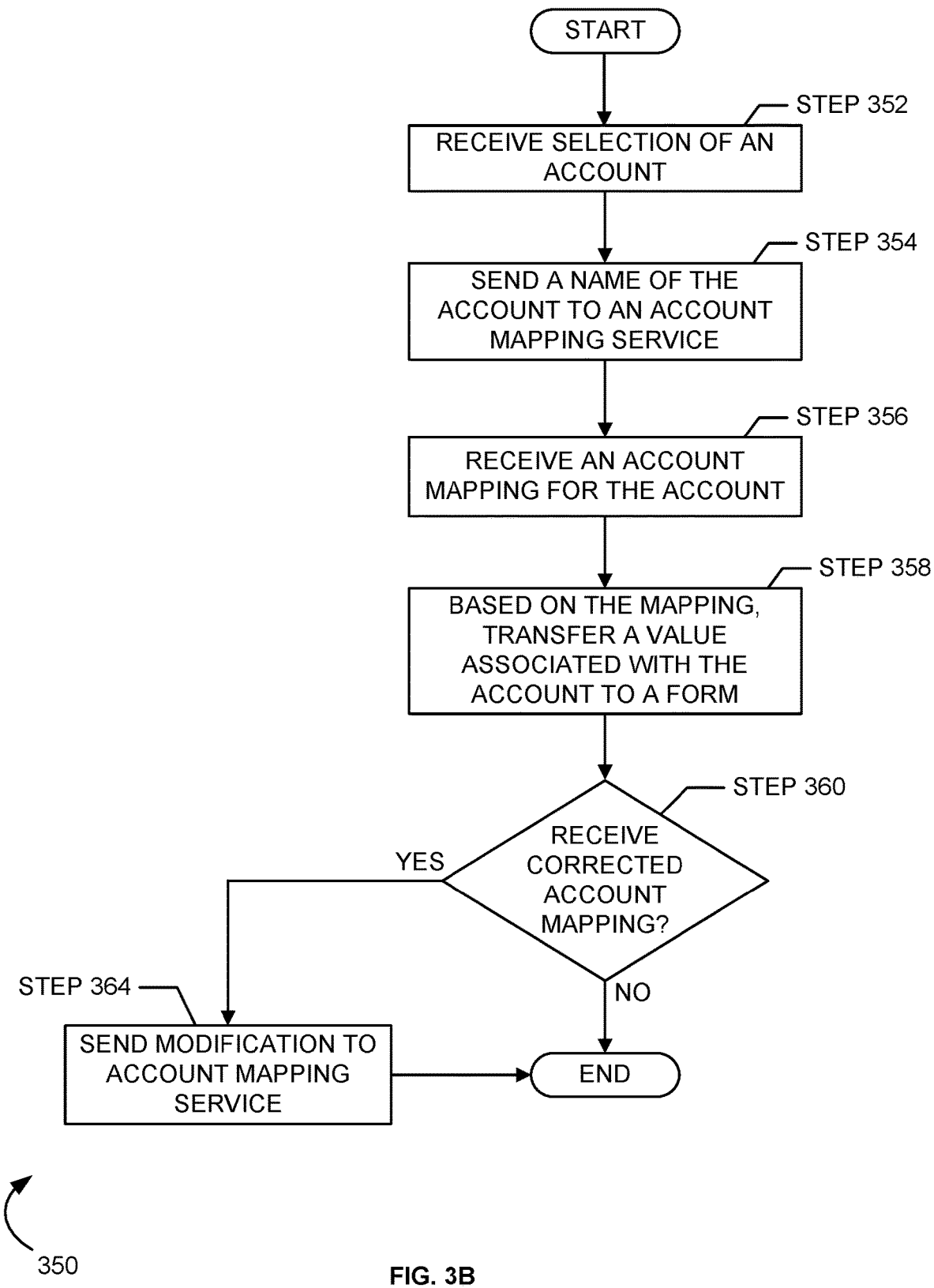

FIG. 3B depicts a flowchart of a method (350) for automated field-mapping of account names using machine learning for automated form population, in accordance with one or more embodiments of the invention. In one or more embodiments, one or more of the steps shown in FIG. 3B may be omitted, repeated, and/or performed in a different order. Accordingly, embodiments of the invention should not be considered limited to the specific arrangements of steps shown in FIG. 3B. In one or more embodiments, the method (350) described in reference to FIG. 3B may be practiced at the accounting application (102), the business entity (104), or the tax preparation application (106) described in reference to FIG. 1A, above, and/or involving the computing system (500) described in reference to FIG. 5A.

As shown in FIG. 3B, an account is selected at Step 352. The selection of the account may be received from a user via a user interface. In one or more embodiments, the selection of the account includes the selection of a report or other document that identifies the account. For example, the selection is of a trial balance report that identifies the account. In this way, the selection of the account includes a selection of multiple accounts. For example, the selection includes all accounts identified within a trial balance report. Of course, however, the selection may include a selection of a single account in any suitable manner. The account may be associated with a value. For example, the account is associated with a dollar value, such as a debit value or credit value.

Further, at Step 354, a name of the account is sent to an account mapping service. The name of the account may include any text label or character string attributed to the account. The name of the account may have been generated by an application, or created based on input from a user (e.g., using a keyboard). As noted above, an entire trial balance report may be selected at Step 352. In such scenarios, some portion, or all of, the account names identified in the trial balance report is sent to the account mapping service. As an option, a trial balance report is sent, in its entirety, to the account mapping service at Step 354.

In one or more embodiments, in addition to an account selection, a form or tax preparation product is selected. Accordingly, in such embodiments, an identifier of the form or software product is sent with the account name.

At Step 356, an account mapping is received. The account mapping may be generated by an account mapping model at the account mapping service. The account mapping includes one or more of an account type, an account sub-type, a code, a series, and a confidence value. In particular, the account type is a top or first level classification of the account name sent at Step 354; and the account sub-type is a second level classification of the account name sent at Step 354. Also, the series is a destination for the value associated with the account, such as a form or software product that will receive the value associated with the account; and the code is a specific location within the destination, such as a field or box, that will receive the value associated with the account. The confidence value is any value representative of the accuracy of the mapping.

If multiple account names are sent at Step 354, such as, for example, multiple account names found in a trial balance report, then a corresponding mapping is received for each account. In other words, a different account type, account sub-type, code, series, and/or confidence value is received for each account name that was sent.

After the mapping is received, the mapping is used, at Step 358, to transfer (e.g., populate) the value associated with the account to a form. For example, if the account selected at Step 352 is an account named "Old Equipment" that is used to track depreciating assets that have recently depreciated $600, then the mapping identifies a type and sub-type of the account. Moreover, the series of the mapping identifies an income tax form, and the code of the mapping identifies a box within the income tax form. Using the code and series, the value of $600 that is associated with the Old Equipment account is automatically transferred to (e.g., populates) the box within the form, without user interaction.

If multiple account mapping are received, then each of the account mappings is used to transfer a value associated with the account for which the mapping was generated. For example, a first account mapping is used to transfer a debit value associated with a first account to a first field in a first form; and a second account mapping is used to transfer a credit value associated with a second account to a second form, or to another field on the first form.

In one or more embodiments, after the mapping is received, the contents of the mapping are displayed. For example, the type, sub-type, series, code, and/or confidence value of the mapping is displayed in a user interface. Any of the elements of the mapping may be edited or reconfigured using the user interface. For example, the type, sub-type, code, or series is modified using one or more drop-down menus, checkboxes, radio buttons, or text boxes. Of course, the contents of more than one account mapping may be displayed for revision at one time, as described in the context of FIG. 4B. In one or more embodiments, a confidence value that falls below a threshold may prompt a user interaction. For example, if a confidence value of a mapping falls below a threshold, then a user interface requests that the user confirm the mapping before any value is transferred based on the mapping (e.g., "is this $600 for 'Old Equipment' an inventory asset?"). This includes a review of the contents of the mapping, or receiving a new value for any element of the mapping.

In one or more embodiments, the mapping is corrected or modified before a transfer (e.g., population) occurs. For example, the user is asked to confirm the contents of a mapping before it is used to transfer a credit value or debit value from a trial balance report to a tax form. In one or more embodiments, the value transfer performed at Step 358 is not correct, and the problem may be identified by a user after the transfer occurs. For example, the transfer may be to a wrong form, or the wrong field of a form.

Accordingly, it is determined, at Step 360, whether a correction to the account mapping is received. The correction to the account mapping may include any user input that modifies the one or more of the type, sub-type, series, or code of the mapping. For example, a user indicates that the "Old Equipment" account should not be classified as inventory, or that the $600 value was inserted into the wrong box of the income tax form. Accordingly, if a correction is received, then a modified account mapping is returned to the mapping service at Step 364, before the method (350) ends. The modified account mapping includes any type, sub-type, series, or code selected or entered by the user. However, if the account mapping is not corrected by the user, then the method (350) ends without sending a mapping modification to the mapping service.

Figure 4A:
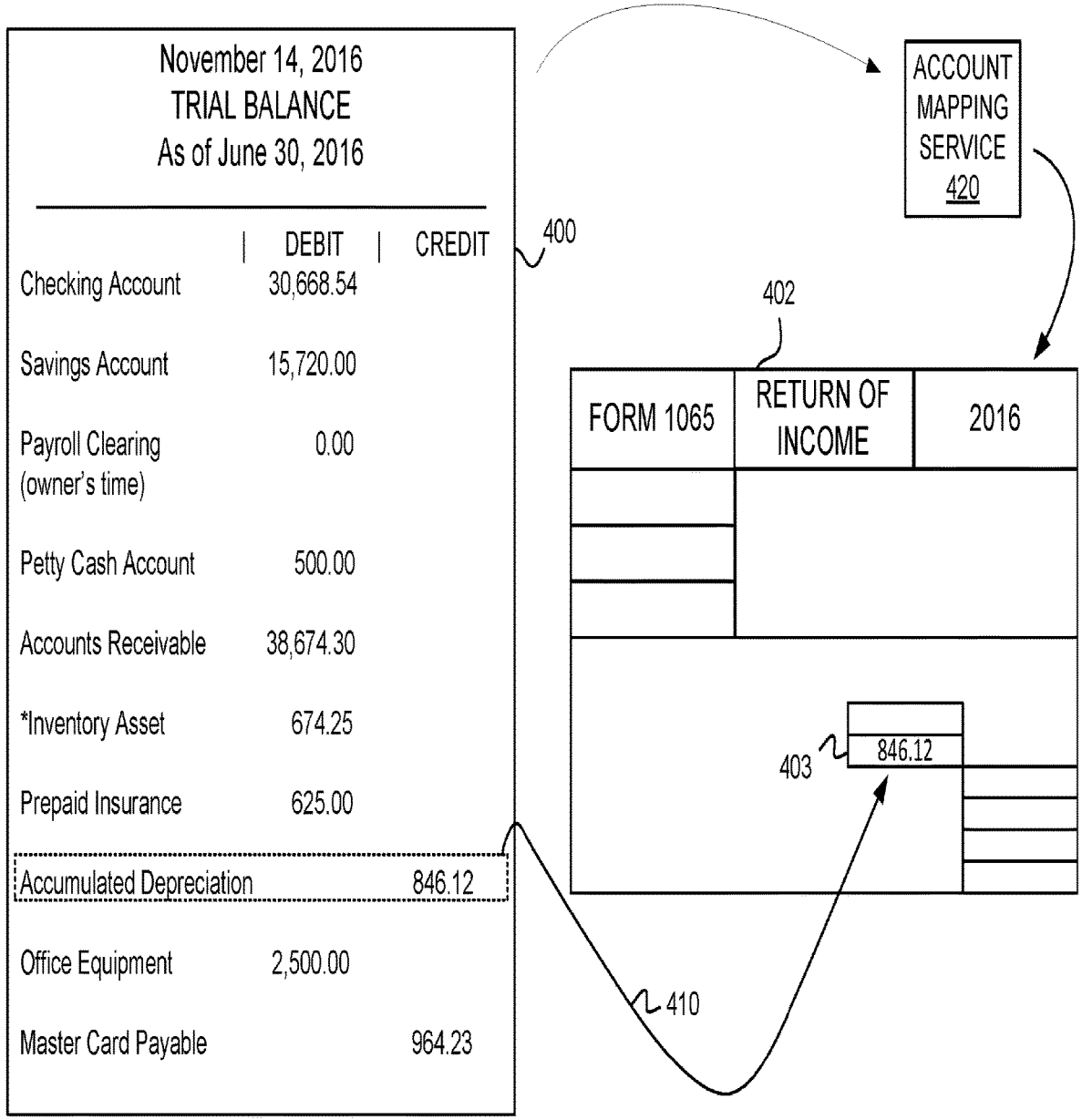

FIGS. 4A and 4B illustrate an example of automated field-mapping of account names using machine learning for automated form population, in accordance with one or more embodiments of the invention.

As depicted in FIG. 4A, a trial balance report (400) has been generated for a business entity. The trial balance report (400) may be generated by an accounting application. The trial balance report (400) includes the names of numerous accounts, as well as a debit value or credit value associated with each of the accounts. For example, the trial balance report (400) identifies an account named "Checking Account" as having a debit value of $30,668.54; an account named "Prepaid Insurance" as having a debit value of $625; and account named "Accumulated Depreciation" as having a credit value of $846.12. Each of the account names found in the trial balance report (400) may originate from a chart of accounts of the business entity for which the report (400) is generated.

As illustrated in FIG. 4A, the trial balance report (400) is provided to an account mapping service (420). In one or more embodiments, the trial balance report (400) is provided to the account mapping service (420) by the accounting application that generated the trial balance report (400), or by a tax preparation application that is attempting to use the contents (i.e., values) of the trial balance report (400). For example, the trial balance report (400) is provided to the account mapping service (420) by the tax preparation application during an import operation. In particular, the import operation is a function of the tax preparation application that digests the contents of a trial balance report, or other report, and automates the population of one or more tax forms, based on the contents therein. The account mapping service (420) includes a machine learning model for determining an account type and account sub-type based on an account name. Also, the machine learning model may determine a code and series based on the account name, and/or the account type and sub-type.

Accordingly, in response to receiving one or more account names of the accounts identified in the trial balance report (400), the account mapping service (420) generates a mapping for the account names. Specifically, the account mapping service (420) generates a mapping (410) for the "Accumulated Depreciation" account of the trial balance report (400). The mapping (410) generated by the account mapping service (420) includes, based on the name of the "Accumulated Depreciation" account, a type of the account, a sub-type of the account, a series, and a code.

More specifically, the mapping (410) identifies the Return of Income form (402) as a destination for the value $846.12 associated with the Accumulated Depreciation account. The mapping (410) may identify the Return of Income form (402) using, for example, the series in the mapping. Further, the mapping (410) identifies a field (403) as a destination for the value $846.12 within the Return of Income form (402). The code in the mapping (410) may specifically identify the field (403) within the form (402) as the destination for the value $846.12 within the Return of Income form (402).

Although the mapping (403) is illustrated to result in the direct transfer of a dollar value from the trial balance report (400) to the form (402), it is understood that various mathematical operations may be performed as a result of mappings. For example, two or more values in the trial balance report (400) may be summed or differenced based on received mappings, and the resulting sum or difference is transferred to (e.g., populate) the mapped destination.

Referring now to FIG. 4B, the mappings of the account mapping service (420) may be reviewed and revised by a user by way of a user interface (450). The user interface (450) displays the mappings generated by the account mapping service (420) for the accounts identified in the trial balance report (400) of FIG. 4A. For example, the user interface (450) shows that the "Accumulated Depreciation" account was mapped to an account type (453) of "Fixed Asset," an account sub-type (454) of "AccumulatedDepreciation," a series (455) of "49," and a code (456) of "18." Similarly, the "Office Equipment" account was mapped to an account type of "Expense" and an account sub-type of "OtherMiscellaneousServiceCost." Also, the "Office Equipment" account was mapped to a series of "38." The series of "38" identifies a specific tax form or application that may receive the $2,500 debit value associated with the "Office Equipment" account. Further, the "Office Equipment" account was mapped to a code that the user would like to modify. Accordingly, based on a user selection of the code, a menu (460) is populated within the user interface (450). The menu (460) includes various locations or fields (i.e., boxes) within a form associated with the series of "38" to which the $2,500 debit value is mapped.

Although the user interface (450) is shown to be engaged with a user for modifying a code included in the mapping for the "Office Equipment" account, it is understood that the user interface (450) may permit the modification of any aspect of any of the mappings. For example, the user modifies the account sub-type "CashOnHand" included in the mapping for the "Petty Cash Account," or the user selects a series other than "51" for the mapping of the "*Inventory Asset" account, using the user interface (450). Also, although the series and code values have been displayed as numerical values, they may take any form. For example, the series and code values may include any alphanumerical string.

After updating the mappings via the user interface (450), the user may save any modifications. As a result of saving the modifications, the modifications may be transmitted back to the account mapping service (420) for updating the account mapping model used to classify the account names within the trial balance report (400).

In one or more embodiments, a confidence value included in a mapping is used to prompt user modifications. For example, if a confidence value in a mapping is below a threshold, then the user interface (450) calls attention to the mapping. The user interface (450) may indicate that the mapping is inaccurate, or request the user manually confirm the automatically generated mapping prior to use.

Figure 5A:
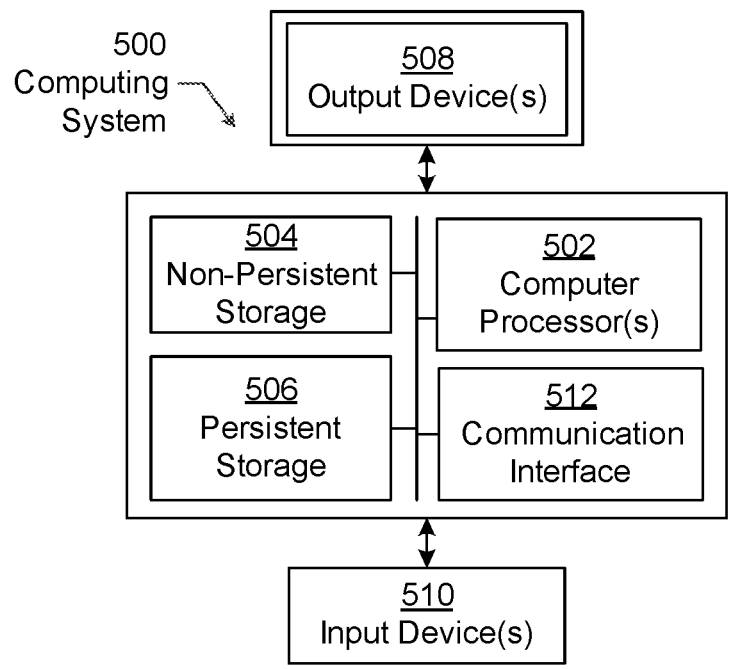
FIG. 5A shows a computing system, in accordance with one or more embodiments of the invention.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
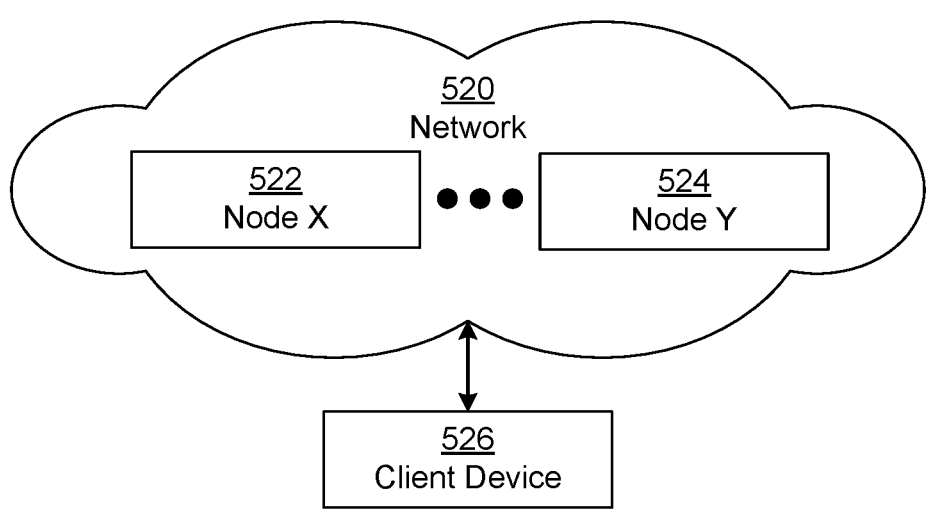
FIG. 5B shows a group of computing systems, in accordance with one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
    obtaining a plurality of labeled accounts labeled by a plurality of accountants;
    pre-processing the plurality of labeled accounts using natural language processing;
    training, using the plurality of pre-processed labeled accounts and by a computing system, an account mapping model that performs multinomial classification;
    receiving, from an accounting application and by the computing system, an account name, wherein the account name is received through an application programming interface (API), and wherein the account name comprises a text label for an account included in a chart of accounts;
    generating an account mapping by the computing system executing the account mapping model using the account name, wherein generating the account mapping comprises:
        performing a first level classification to identify the account type of the account,
        performing a second level classification to identify a sub-type of the account, wherein the sub-type is hierarchically located under the account type, and
        applying a mapping to the sub-type to obtain a code and a series associated with an accounting form, wherein the code and series identifies a destination in the accounting form;
    returning, by the computing system, the account mapping to the accounting application through the API;
    receiving, from a client device, a correction to the account mapping; and
    retraining, by the computing system, the account mapping model using upsampling based on the correction.

2. The method of claim 1, wherein the natural language processing includes application of a bag of words model.

3. The method of claim 1, wherein the multinomial classification is based on naïve Bayes.

4. The method of claim 1, wherein the account name is received from the client device in a trial balance report.

5. The method of claim 4, wherein the trial balance report includes one or more additional account names, wherein one or more additional account mappings are identified by applying the account mapping model to each of the one or more additional account names, and wherein each of the one or more additional account mappings are returned to the client device.

6. A non-transitory computer readable medium storing instructions, the instructions, when executed by a computer processor, comprising functionality for:
    obtaining a plurality of labeled accounts labeled by a plurality of accountants;
    pre-processing the plurality of labeled accounts using natural language processing;
    training, using the plurality of pre-processed labeled accounts, an account mapping model that performs multinomial classification;
    receiving, from an accounting application, an account name, wherein the account name is received through an application programming interface (API), and wherein the account name comprises a text label for an account included in a chart of accounts;
    generating an account mapping by applying the account mapping model to the account name, wherein the generating the account mapping comprises:
        performing a first level classification to identify the account type of the account,
        performing a second level classification to identify a sub-type of the account, wherein the sub-type is hierarchically located under the account type, and
        applying a mapping to the sub-type to obtain a code and a series associated with an accounting form, wherein the code and series identifies a destination in the accounting form;
    returning the account mapping to the accounting application through the API;
    receiving, from a client device, a correction to the account mapping; and
    retraining the account mapping model using upsampling based on the correction.

7. The non-transitory computer readable medium of claim 6, wherein the natural language processing includes application of a bag of words model.

8. The non-transitory computer readable medium of claim 6, wherein the multinomial classification is based on naïve Bayes.

9. The non-transitory computer readable medium of claim 6, wherein the account name is received from the client device in a trial balance report.

10. The non-transitory computer readable medium of claim 9, wherein the trial balance report includes one or more additional account names, wherein one or more additional account mappings are identified by applying the account mapping model to each of the one or more additional account names, and wherein each of the one or more additional account mappings are returned to the client device.

\* \* \* \* \*